United States Patent [19]
Daeuble et al.

[11] 3,844,711
[45] Oct. 29, 1974

[54] LOW-FROTH, WATER-SOLUBLE DYEING AUXILIARIES

[75] Inventors: Manfred Daeuble, Frankenthal; Knut Oppenlaender; Rolf Fikentscher, both of Ludwigshafen, all of Germany

[73] Assignee: Badische Anilin & Soda-Fabrik Aktiengesellschaft, Ludwigshafen/Rhein, Germany

[22] Filed: Jan. 12, 1972

[21] Appl. No.: 217,226

[30] Foreign Application Priority Data
Jan. 22, 1971 Germany............................ 2102899

[52] U.S. Cl.................................. 8/93, 8/85, 8/92, 8/169, 8/172, 252/321, 252/358
[51] Int. Cl............................................... D06p 1/82
[58] Field of Search............ 8/93, 172, 92; 252/358

[56] References Cited
FOREIGN PATENTS OR APPLICATIONS
1,540,770   8/1968   France..................................... 8/93

*Primary Examiner*—Donald Levy
*Attorney, Agent, or Firm*—Johnston, Kiel Thompson & Shurtleff

[57] ABSTRACT

Low-froth water-soluble dyeing auxiliaries based on surfactants and esterification products of fatty acids and oleic acid.

7 Claims, No Drawings

LOW-FROTH, WATER-SOLUBLE DYEING AUXILIARIES

This invention relates to water-soluble dyeing auxiliaries that dissolve clearly in the dye liquor with little or no frothing.

The auxiliaries may be employed, depending on their specific compositions, for dyeing natural and synthetic fibers of all types, provided the pH is in the range between 2.5 and 8.0 during dyeing.

In most instances, dyeing auxiliaries hitherto used in the textile industry have been surfactants (detergents) which exhibit high foaming or frothing power in aqueous solution with the usual concentrations employed. In many dyeing processes dense foam may be produced and lead to serious disturbances. For this reason there was great interest in reducing foaming or preventing it completely.

The simplest method would be to use non-frothing products as dyeing auxiliaries. Only in a few cases has it been possible to date to find such products, and these were often clearly inferior in various important properties to the foam-products already known. Attempts have been made to prevent foam formation and/or destroy foam already formed by the addition of defoaming agents. Defoaming agents containing silicone oils are particularly effective (Walter Noll, Chemie and Technologie der Silicone, Verlag Chemie, Weinheim, Bergstrasse, 1960, p. 401). The formation of a surface film of silicone oil insoluble in the liquor is necessary for the defoaming effect. According to D. G. Dervichian, Zeitschrift fur Elektrochemie, 59, 240 (1955), the theory of defoaming requires that the defoaming agent be insoluble in the medium to be defoamed. However, it is not easy to emulsify the silicone oils in such a way that they form uniform surface films. These emulsions often break, when the silicone oils are precipitated and settle on the textiles. They produce stains that are practically irremovable.

According to the authority just quoted one also employs other products insoluble in water as defoaming agents, for instance mineral oils or tributylphosphate. The defoaming effect of these products is distinctly less than that of the silicone oils; they too form emulsions of inadequate stability and may cause stains by the emulsions being broken. Similar considerations apply to fatty acids and their aluminum and alkaline earth metal salts and to mixtures of aliphatic alcohols, ketones and esters. Some of these compounds are characterized by an unpleasant odor of varying degree that can be a great nuisance for the operating personnel.

Fatty acids, their water-insoluble salts and silicones often have an undesirable hydrophobic effect. From French Pat. No. 1,543,714 it is known that esters from one mole of an addition product of ethylene oxide and where appropriate subsequently propylene oxide with a polypropylene glycol ether having a mean molecular weight of from 1,000 to 5,000 and containing between 15 and 60 percent of etherified ethylene glycol groups relative to the total weight of the addition product, and 2 moles of a saturated fatty acid with 12 to 18 carbon atoms can also be used as defoaming agents. However, these products are soluble in water only with great difficulty and form turbid emulsions or dispersions from which they are often precipitated, settling on the textiles being treated and causing stains. When the dye liquor flows through the material being dyed, these compounds are filtered off, become ineffective and form troublesome deposits. If these products are used for defoaming padding liquors, specks and stains are formed on the material because of the precipitated insoluble defoaming agents.

It is an object of the present invention to provide a water-soluble, non-foaming dyeing auxiliary which does not exhibit the aforementioned disadvantages and when dyeing from a long bath improves evenness of the coloration, prevents difficultly soluble dyes from being precipitated and improves fastness to crocking.

Another object of the invention is to provide an article that improves the wetting effect and ensures uniform distribution of the dye on the fiber. These and other objects and advantages of the invention are achieved by low-froth, water-soluble dyeing auxiliaries based on non-ionic surfactants containing:

a. 10 to 70 percent by weight, with reference to the dyeing auxiliary, of a non-ionic surfactant;

b. 10 to 70 percent by weight, with reference to the dyeing auxiliary, of an esterification product from 2 molar equivalents of a mixture of fatty acids containing not less than 30 percent oleic acid, and from one molar equivalent of a block copolymer of ethylene oxide and 1,2-propylene oxide, having a molecular weight of about 1,500 to 7,000, the sum of (a) and (b) being less than or equal to 95 percent by weight; and c. less than 20 to 5 percent by weight, with reference to the dyeing auxiliary, of water, an organic solvent or a mixture of the two.

The fact that the dyeing auxiliaries in accordance with the invention do not produce foaming is surprising, since according to D. G. Dervichian (loc. cit.) the theory of defoaming requires that the defoaming agent be insoluble in the medium to be defoamed. It was particularly surprising that by partially or entirely replacing the saturated fatty acids by oleic acid clear dyebaths and padding liquors are obtained, whereas the esters of the saturated fatty acids alone, even in the presence of surfactants, are absolutely insoluble in water.

The saturated fatty acid esters are insoluble in water unless further additives are employed. However, dissolving these compounds in dyebaths in the presence of surfactants is inconvenient and time-consuming; large particles may remain undissolved and cause stains on the material.

The dyeing auxiliaries in accordance with the invention can be obtained as clear, homogeneous mixtures with very good storage life at room temperature simply be stirring the stated mixtures of oleic acid and fatty acid esters with surfactants and water.

The stability of the auxiliaries during storage can be still further improved by adding weater-soluble organic solvents such as butyl diglycol, butyl triglycol, isopropanol, dipropylene glycol, butyrolactone, N-methylpyrrolidone or dimethyl formamide. A mixture of water and solvent may also be used.

Depending on the additives used for these water-soluble organic solvents, the new dyeing auxiliaries are slightly to highly viscous and also — surprisingly — miscible with water in all proportions, when they give at once a clear, homogeneous solution. They facilitate the manufacture of stable, non-foaming dyebaths and padding liquors in a really ideal fashion, since the use of ready-made mixtures of dyeing auxiliaries is definitely more convenient than when each of the components has to be weighed out separately and added to the dyebath or padding liquor. Moreover, blending of the individual components to produce stable mixtures can be better supervised and controlled than can the preparation of dyebaths and padding liquors when each component is added separately.

Surfactants which may be employed as component (a) for the purposes of the invention are, for instance: non-ionogenic compounds such as addition products of ethylene oxide, propylene oxide, butylene oxide or mixtures of these epoxides with saturated fatty acids, fatty alcohols, fatty amines, fatty amides, alkyl phenols, glycols and other compounds whose active hydrogen atoms permit the addition of low molecular weight epoxides.

The compounds cited are known washing, wetting and levelling auxiliaries which, when used alone, cause very powerful foaming, i.e., have the same disadvantages.

Component (b) of the dyeing auxiliaries in accordance with the invention represents the defoaming component. These are esterification products of fatty acid mixtures containing oleic acid with block copolymers bearing two terminal hydroxyl groups in which the proportion of polymerized ethylene oxide units is between 10 and 80 percent by weight, preferably 20 and 60 percent by weight, while the proportion of polymerized propylene oxide units is between 20 and 90 percent by weight, preferably 40 and 80 percent.

These block copolymers subsequently esterified with the fatty acid mixture may be manufactured by the addition of ethylene oxide to polypropylene glycol or the addition of propylene oxide to polyethylene glycol. These procedures may also be carried out alternately in several steps. For instance, ethylene oxide and propylene oxide may be alternately added to polypropylene glycol and/or propylene oxide and ethylene oxide alternately added to polyethylene glycol.

Mixtures of the esterified fatty acids contained in accordance with the invention are derived from naturally occurring mixtures of fatty acids and oleic acids.

These include: soya bean fatty acid, peanut oil fatty acid, fatty acids derived from bovine, pig or mutton tallow, or palm oil fatty acid, all of which contain at least 30 percent oleic acid. In addition, such mixtures can be produced by mixing, in accordance with the definition, oleic acid with $C_{10}$ to $C_{30}$ fatty acids which are saturated.

Of the various fatty acids the following are particularly suitable as saturated fatty acid components for the purposes of the invention: capric acid, myristic acid, palmitic acid, stearic acid, arachidic acid, behenic acid and cerotic acid.

The dyeing auxiliaries in accordance with the invention are obtained by mixing the surfactants with the said ester mixtures, water and/or organic solvents which are miscible with water. Depending on the detergent employed, the dyeing auxiliaries have a levelling, wetting or washing effect, and the liquors either foam only very slightly or not at all. The effct of the detergents remains unaffected; indeed, in some cases an improved effect has been observed.

The dyeing auxiliaries in accordance with the invention have the following composition:

10 to 70 percent by weight, with reference to the dyeing auxiliary, preferably 15 to 65 percent by weight, of one or more of the aforementioned detergents;

10 to 70 percent by weight, with reference to the dyeing auxiliary, of the esterification product of two molar equivalents of a mixture of fatty acids containing at least 30 percent, preferably 40 to 80 percent, of oleic acid, and one molar equivalent of a block copolymer, carrying two terminal hydroxyl groups, of ethylene oxide and 1,2-propylene oxide, the product having a molecular weight of 1,500 to 7,000, the weight of this mixture accounting for 20 to 95 percent of the total weight of the dyeing auxiliary, and less than 20 to 5 percent, preferably 10 to 5 percent by weight, with reference to the dyeing auxiliary, of water and/or organic solvent.

The dyeing auxiliaries in accordance with the invention can be employed in all dyebaths and padding liquors in which the pH is between 2 and 8. They cannot be used in caustic alkali liquors because the defoaming component becomes saponified and hence inactivated.

The following formula for the use of the dyeing auxiliaries in accordance with the invention have proved to be particularly effective for the various types of fiber:

In the dyeing of wool with metal complex dyes and acid dyes the mixtures give level colorations and dyeliquors which are more or less free of foam. Known anion-active auxiliaries may be additionally added, e.g. terminally sulfonated adducts of ethylene oxide and fatty alcohols, alkylphenols, fatty amides or fatty amines. In this way the stability of the liquors is improved in known manner, and the strong tendency of these products to foam is clearly reduced. The auxiliaries also remove the foam produced by diluents contained in the dyes. The claimed auxiliaries will suppress foam most effectively if they contain less of component (a) than of component (b).

In the dyeing with disperse dyes of fibers of synthetic polyamides and polyesters, particularly glycol terephthalate based polyester fibers, the said mixtures give foam-free stable liquors and level colorations. Additional dispersing agents that may be added to the dyeliquors are, for example, reaction products of formaldehyde and naphthalenesulfonic acid as well as carriers of all types whose active ingredients are halobenzene, esters of salicylic or homosalicylic acid and diphenyl or o-hydroxydiphenyl.

The auxiliaries also give foam-free padding liquors with disperse dyes of all types used for the thermosol dyeing of polyester and polyamide fiber materials. The liquors may additionally contain conventional thickeners, wetting agents and agents for preventing pigment migration.

Moreover, the auxiliaries improve the stability of polymer dispersions with which textile material is padded from an aqueous bath. Due to the presence of the non-ionogenic surfactant the stability of the dispersion is improved so that the rollers remain free from deposits. The antifoam component prevents the troublesome foam formation which occurs when surfactant is used alone and is a great nuisance. The combination of surfactant and antifoam component has a synergistic effect regarding the stabilization of polymer dispersions, prevention of deposits on the rollers and antifoam effect.

Examples of surfactants that may be added are oxyethylation products of castor oil, fatty alcohols, oxo alcohols, alkylphenols, fatty acids and fatty amides.

EXAMPLE 1

50 parts of the esterification product of 2 moles of tallow acid and the adduct of 20 moles ethylene oxide to propylene oxide (M2,600) is mixed with 40 parts of an adduct of 35 moles ethylene oxide to castor oil and 10 parts water. A viscous liquid is obtained which is stable in storage and is miscible with water in all proportions.

100 parts of a knitted fabric of textured polyester fibers is dyed for 90 minutes at 125° C in 2,000 parts of a dyeliquor containing 1 part of the said mixture, 1 part of the sodium salt of a condensation product of naphthalenesulfonic acid and formaldehyde, and 2 parts of the finely divided dye C.I. Disperse Yellow 64. A level greenish yellow material is obtained which is fast to crocking. The liquor exhibits practically no foaming so that the material does not float and runs smoothly during the entire operation.

Further auxiliaries are mixed from the following components:

Component A: adduct of 20 moles ethylene oxide to polypropylene glycol (M 2,600)
Component B: adduct of 18 moles ethylene oxide to polypropylene glycol (M 1,700)
Component C: ester of 2 moles tallow acid and 1 mole component A
Component D: castor oil, oxyethylated with 47 moles ethylene oxide
Component E: oleic acid, oxyethylated with 5 moles ethylene oxide
Component F: stearic acid, oxyethylated with 9 moles ethylene oxide
Component G: nonyl phenol, oxyethylated with 14 moles ethylene oxide
Component H: nonyl phenol, oxyethylated with 20 moles ethylene oxide.

To demonstrate the extent of foam formation, solutions containing 0.5 and 1 g/l of the said auxiliaries were beaten with a perforated plunger in a graduated cylinder by the method of German Standard Specification DIN 53 902 and the time required by the foam to disintegrate was stopped. In the said Specification the foam height is not read until after at least a minute. However, since when using the auxiliaries of the invention the foam mostly disintegrated in less than 30 seconds, the time was read after which the foam had completely disintegrated.

In repeated dyeing tests it was found that the values obtained by the method of DIN 53 902 using a cylinder and a plunger agreed very well with the behavior of the liquors in actual practice.

EXAMPLE 2

20 parts A, 50 parts C, 20 parts D, 10 parts water. Viscous liquid giving clear solution in water. Disintegration of foam in cylinder in DIN test method 53 902.

| Room temperature | 0.5 g/l 29 seconds | 1 g/l | 8 seconds |
|---|---|---|---|
| 60°C | 0.5 g/l 9 seconds | 1 g/l | 13 seconds. |

EXAMPLE 3

30 parts A, 50 parts C, 10 parts G, 10 parts water. Viscous liquid, giving clear solution in water. Disintegration of foam in cylinder in DIN test method 53 902.

| Room temperature | 0.5 g/l 16 seconds | 1 g/l | 10 seconds |
|---|---|---|---|
| 60°C | 0.5 g/l 14 seconds | 1 g/l | 30 seconds |

EXAMPLE 4

20 parts A, 50 parts C, 20 parts H, 10 parts water. Viscous liquid, giving clear solution in water. Disintegration of foam in cylinder in DIN test method 53 902.

| Room temperature | 0.5 g/l 25 seconds | 1 g/l 20 seconds |
|---|---|---|
| 60°C | 0.5 g/l 10 seconds | 1 g/l 18 seconds |

EXAMPLE 5

20 parts B, 50 parts C, 20 parts D, 10 parts water. Viscous liquid, giving clear solution in water. Disintegration of foam in cylinder in DIN test method 53 902.

| Room temperature | 0.5 g/l 16 seconds | 1 g/l 30 seconds |
|---|---|---|
| 60°C | 0.5 g/l 14 seconds | 180 ml foam after 30 seconds |
| | | 40 ml foam after 60 seconds |
| | | no foam after 120 seconds |

EXAMPLE 6

30 parts B, 50 parts C, 10 parts H, 10 parts water. Viscous liquid, giving clear solution in water. Disintegration of foam in cylinder in DIN test method 53 902.

| Room temperature | 0.5 g/l 27 seconds | 1 g/l 19 seconds |
|---|---|---|
| 60°C | 0.5 g/l 22 seconds | 1 g/l 30 seconds. |

EXAMPLE 7

50 parts C, 30 parts D, 10 parts E, 10 parts water. Viscous liquid, giving clear solution in water. Disintegration of foam in cylinder in DIN test method 53 902.

| Room temperature | 0.5 g/l 6 seconds | 1 g/l 10 seconds |
|---|---|---|
| 60°C | 0.5 g/l 10 seconds | 1 g/l 16 seconds. |

EXAMPLE 8

50 parts C, 20 parts D, 20 parts E, 10 parts water. Viscous liquid, giving clear solution in water. Disintegration of foam in cylinder in DIN test method 53 902.

| Room temperature | 0.5 g/l 7 seconds | 1 g/l 11 seconds |
| 60°C | 0.5 g/l 11 seconds | 1 g/l 15 seconds. |

EXAMPLE 9

50 parts C, 20 parts E, 20 parts H, 10 parts water. Viscous liquid, giving clear solution in water. Disintegration of foam in cylinder in DIN test method 53 902.

| Room temperature | 0.5 g/l 10 seconds | 1 g/l 11 seconds |
| 60°C | 0.5 g/l 18 seconds | 1 g/l 28 seconds. |

EXAMPLE 10

60 parts C, 10 parts E, 20 parts G, 10 parts water. Viscous liquid, giving clear solution in water. Disintegration of foam in cylinder in DIN test method 53 902.

| Room temperature | 0.5 g/l 15 seconds | 1 g/l 30 seconds |
| 60°C | 0.5 g/l 18 seconds | 1 g/l 30 seconds. |

EXAMPLE 11

40 parts C, 20 parts E, 30 parts H, 10 parts water. Viscous liquid, giving clear solution in water. Disintegration of foam in cylinder in DIN test method 53 902.

| Room temperature | 0.5 g/l 14 seconds | 1 g/l 29 seconds |
| 60°C | 0.5 g/l 9 seconds | 1 g/l 30 seconds. |

The mixtures of Examples 2 to 11 may be used as low-froth or antifoam leveling agents in the dyeing of polyester fibers with disperse dyes. Very level colorations are obtained, and the tendency of the material to develop creases is reduced. The dyeliquors are absolutely stable and there is no deposition such as occurs when using water-insoluble defoaming agents based on silicon oils, mineral oils or phosphoric esters.

We claim:

1. A textile dyeing liquor having a pH of between 2 and 8, containing a dyestuff and having added thereto a low-froth, water-soluble dyeing auxiliary consisting essentially of:
   a. 10 to 70 percent by weight, with reference to the dyeing auxiliary, of a non-ionic surfactant;
   b. 10 to 70 percent by weight, with reference to the dyeing auxiliary, of an esterification product from 2 molar equivalents of a mixture of higher fatty acids containing not less than 30 percent oleic acid and from one molar equivalent of a block copolymer, carrying 2 terminal hydroxyl groups, of ethylene oxide and 1,2-propylene oxide having a molecular weight of about 1,500 to 7,000, the sum of (a) and (b) being less than or equal to 95 percent by weight; and
   c. less than 20 to 5 percent by weight, with reference to the dyeing auxiliary, of water.

2. A composition as claimed in claim 1 wherein component (b) is an esterification product of a block copolymer carrying two terminal hydroxyl groups, which product consists, with reference to the weight of the block copolymer, of 10 to 80 percent ethylene oxide units and 90 to 20 percent propylene oxide units.

3. A composition as claimed in claim 1 wherein component (b) is an esterification product of an addition product, carrying two terminal hydroxyl groups, of ethylene oxide to a polypropylene glycol or of propylene oxide to a polyethylene glycol.

4. A composition as claimed in claim 1 wherein component (b) is an esterification product of a block copolymer, carrying two terminal hydroxyl groups, obtained by multiple alternating addition of ethylene oxide and propylene oxide to polypropylene glycol or of propylene oxide and ethylene oxide to polyethylene glycol.

5. A composition as claimed in claim 1 in which the fatty acid mixture of component (b) consists essentially of soya bean acid, peanut oil acid, tallow acids obtained from bovine, pig or mutton tallow, or palm oil acid as mixtures of saturated fatty acids containing not less than 30 percent oleic acid.

6. A composition as claimed in claim 1 in which the fatty acid mixture of component (b) consists essentially of said oleic acid and capric acid, myristic acid, palmitic acid, stearic acid, arachidic acid, behenic acid or cerotic acid as a saturated fatty acid component.

7. A composition as claimed in claim 1 wherein said dyeing auxiliary contains 15 to 65 percent by weight of component (a), 10 to 70 percent by weight of component (b) and 10 to 5 percent by weight of component (c), the percentage of oleic acid in (b) being from 40 to 80 percent and the percentages being based on the dyeing auxiliary.

* * * * *